United States Patent

Markowitz

[11] Patent Number: 5,823,844
[45] Date of Patent: Oct. 20, 1998

[54] INTERACTIVE VIBRATING TOY

[76] Inventor: Eli Markowitz, 1173 52nd St., Brooklyn, N.Y. 11219

[21] Appl. No.: 291,973

[22] Filed: Aug. 17, 1994

[51] Int. Cl.$^6$ ............................................. A63H 11/02
[52] U.S. Cl. ..................... 446/175; 446/358; 446/366; 446/236; 446/361; 446/437; 446/462; 40/414; 119/707
[58] Field of Search ............... 40/218, 411, 414, 40/417, 427, 429, 430; 119/702, 707, 708, 711; 601/46, 67–70, 72, 80–82; 366/117, 122, 123, 128; 310/81, 89; 446/175, 366, 330, 236, 351, 238, 352, 359, 358, 361

[56] References Cited

U.S. PATENT DOCUMENTS

| | | | |
|---|---|---|---|
| 2,282,700 | 5/1942 | Bobbroff | 601/68 |
| 2,284,209 | 5/1942 | Holm | 40/218 |
| 2,597,505 | 5/1952 | Lindkvist | 366/122 |
| 3,504,665 | 4/1970 | Bakvnin | 601/71 |
| 3,685,080 | 8/1972 | Hubner | 310/81 |
| 3,888,030 | 6/1975 | Bradt | 40/411 |
| 4,091,805 | 5/1978 | Clark | 601/80 |
| 4,097,917 | 6/1978 | McCaslin | 446/175 |
| 4,135,826 | 1/1979 | Holm | 366/128 |
| 4,808,862 | 2/1989 | Carvalho | 310/89 |
| 4,910,647 | 3/1990 | Gong | 40/411 |
| 4,930,448 | 6/1990 | Robinson | 119/29 |
| 4,949,486 | 8/1990 | Belokin | 40/414 |
| 4,983,890 | 1/1991 | Satoh | 446/175 |
| 5,067,480 | 11/1991 | Woog et al. | 601/46 |
| 5,123,405 | 6/1992 | McShirley | 601/70 |
| 5,146,702 | 9/1992 | Belokin, Jr. | 446/236 |
| 5,247,218 | 9/1993 | Sven | 310/81 |

FOREIGN PATENT DOCUMENTS 2090746  7/1982  United Kingdom ................. 601/71

*Primary Examiner*—Sam Rimell
*Assistant Examiner*—Jeffrey D. Carlson
*Attorney, Agent, or Firm*—Helfgott & Karas, P.C.

[57] ABSTRACT

A vibrating toy is provided and includes a housing, a battery mounted within the housing, a motor mounted within the housing activated by the battery, a shaft driven by the motor, a mechanism on the shaft for imparting an eccentric vibration from the housing, a play element outside of the housing, and a mechanism for connecting the play element to the housing and through which the play element can receive vibrations generated from the mechanism that imparts the eccentric vibration. A weighted element attached to the shaft in a manner to unsymmetrically distribute weight imparts the eccentric vibration. In a particularly preferred embodiment, a vibration is transferred to the housing which in turn through contact vibrates a wire serving as the mechanism that connects to the play element. The invention further concerns a method whereby a live pet animal can be entertained by interaction with the aforementioned vibrating toy.

6 Claims, 9 Drawing Sheets

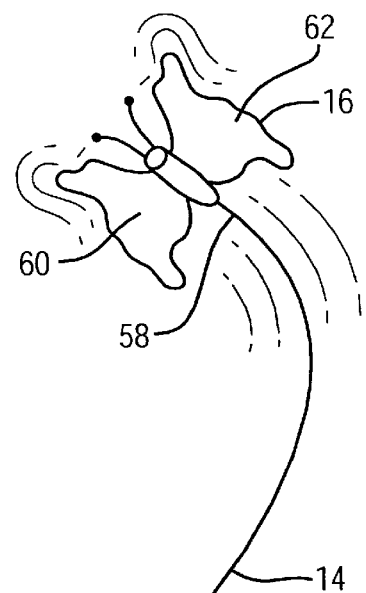
FIG. 1
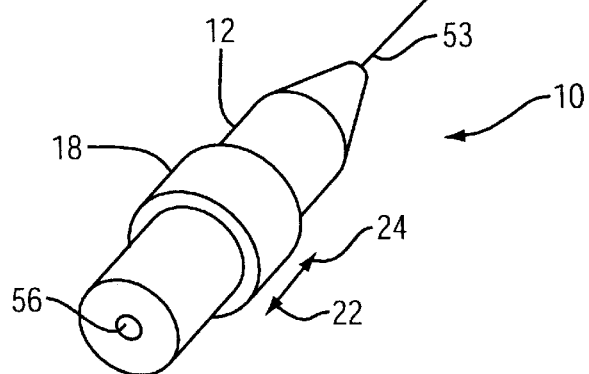
FIG. 2
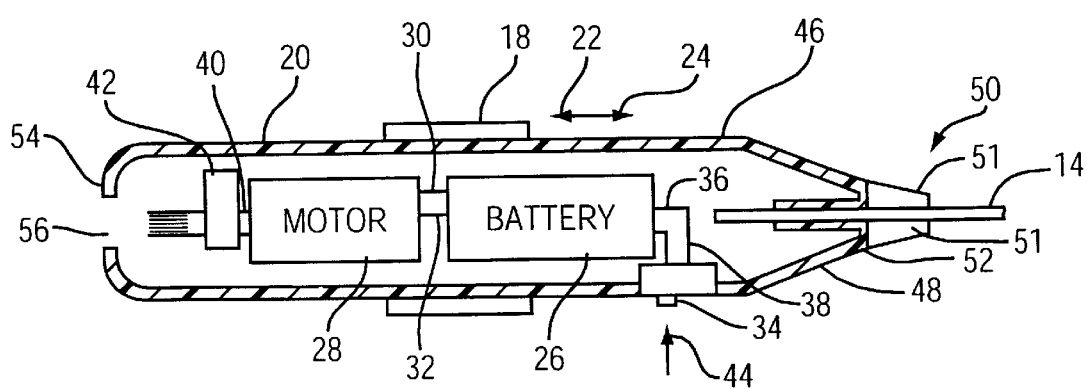

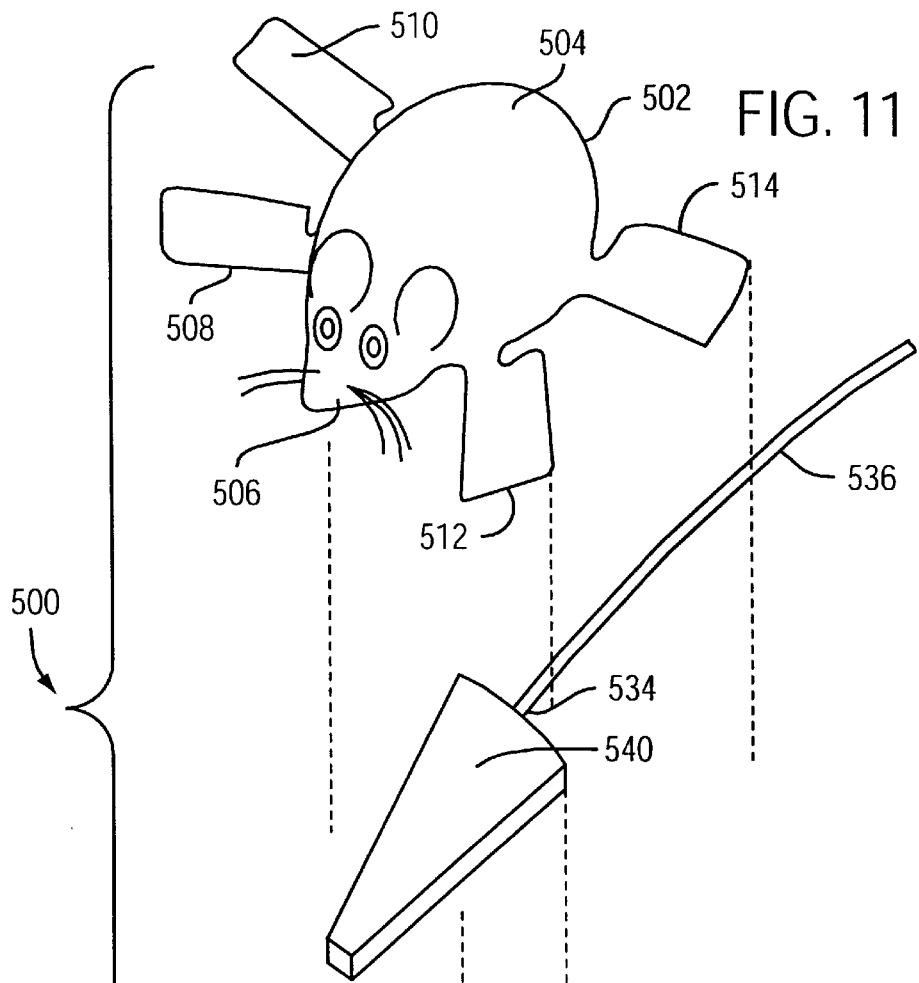
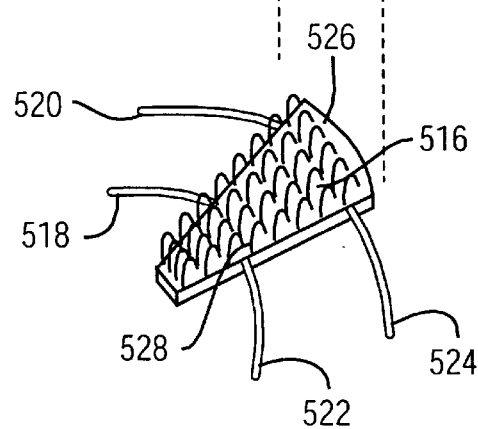
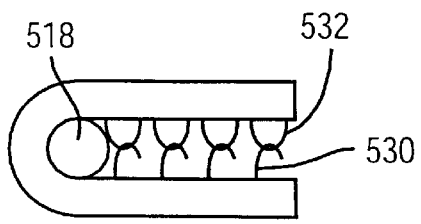

INTERACTIVE VIBRATING TOY

BACKGROUND OF THE INVENTION

The present invention relates generally to the field of toys for use by a pet animal such as a cat or a dog and more particularly to an interactive vibrating toy which can be used by an owner during interactive play with a pet animal.

The prior art describes various types of devices which are designed for play with pet animals. Included among this prior art are the following U.S. Patents: U.S. Pat. No. 2,833,244 issued to Bolilman; U.S. Pat. No. 4,177,761 issued to Bellochi; U.S. Pat. No. 4,903,424 issued to Satoh et al.; U.S. Pat. No. 4,930,448 issued to Robinson; U.S. Pat. No. 5,103,770 issued to Berkovich; U.S. Pat. No. 5,119,001 issued to Moore et al.; and U.S. Pat. No. 5,146,702 issued to Belokin.

From the above list, only U.S. Pat. No. 5,146,702 issued to Belokin is generally similar in purpose to the integrated vibrating toy according to the present invention. However, examination of Belokin and the other patents indicates significant limitations and differences between devices described therein and the apparatus according to the present invention.

U.S. Pat. No. 5,146,702 issued to Belokin shows a device in which an elongated wire is eccentrically mounted on a disk which is rotated by a battery operated motor. A toy is mounted on the end of the wire and rotation of the disk causes rotation and flexing of the wire to impart motion to the toy. There is no way to easily adjust either the length of the wire or the amplitude of the motion which is applied to the wire so the device generates user interest for only a limited time.

OBJECTS AND SUMMARY OF THE INVENTION

It is an object of the present invention to provide an interactive vibrating toy which can be utilized for extended play with a pet animal.

Another object of the present invention is to provide an interactive vibrating toy which can be easily adjusted to provide a broad range of flight-like motions to a toy insect.

Another object of the present invention is to provide an interactive vibrating toy which can be used to impart motion to a range of insects and animals thereby creating continuing interest and extended time periods of interactive play for an owner and a pet animal.

Yet another object of the present invention is to provide an interactive vibrating toy which can be easily adjusted to have a range of vibrating motions.

SUMMARY OF THE INVENTION

A vibrating toy is provided that includes: a housing; a battery mounted within the housing; a motor mounted within the housing activated by the battery; a shaft driven by the motor; a mechanism on the shaft for imparting an eccentric vibration to the housing; a play element outside of the housing; and a mechanism for connecting the play element to the housing and through which the play element can receive vibrations generated from the mechanism for imparting the eccentric vibration.

The housing has an aperture, a first end and a second end. The mechanism for connecting the play element and housing includes a wire fastened within the first end of the housing and extending outward through the aperture. A special feature of the invention is the mechanism for imparting eccentric vibration best accomplished a weighted element attached to the shaft in a manner to unsymmetrically distribute weight onto the shaft. Furthermore, the toy may include a collar at least partially surrounding the housing. This collar may be movable along the housing thereby altering the amplitude of the vibrations generated by the mechanism on the shaft for imparting the eccentric vibration.

In a first aspect, the wire extending outward through the aperture of the housing is not in communication with the shaft but is vibrated only by the vibrations received through the housing. The first end of the housing may have a tapered portion that includes adjustable jaws for releasably mounting the wire onto the housing.

Play elements of the present invention may resemble a living creature such as an insect, a bird and mammal. Butterflys are illustrative of the insects category. Rodents such as mice are illustrative of the mammal category.

An alternative second embodiment of the invention involves the use of a telescoping member and a connector. The latter is present to couple the wire to the first end of the housing. Another alternative embodiment mounts the housing rotatably on a stationary base member. Rotation is induced by the mechanism for imparting eccentric vibration. Here the second end of the housing is mounted in a central cavity of the stationary base member. An infra-red motion detector may be arranged on an outer surface or within the housing to project an infra-red light beam outward from the housing. This beam is present to sense movement such as that of a live pet investigating the toy. An electronic timer may also be associated with the housing, electrically communicating with the motion detector and motor to activate and deactivate the motor for preselected time.

Various alternatives of mounting connections may also be utilized. For instance, a coupling member may be attached to the wire end distant from the first end of the housing. This coupling member should be in contact with and retain the play element. Preferably the coupling has a wedge-shape. A particularly useful arrangement is where the coupling member has walls folded to retain between the walls a play element which is a food, such as catnip, attractive to animals. The outer surface of the coupling member may be provided retaining structures with VELCRO hook and loop arrangements and a flexible top member with corresponding retaining structures interacting with the coupling member outer surface to maintain the folded wall position. In an alternative manner, the coupling member and play element may have retaining structures with VELCRO hook and loop arrangements to releasably fasten together the coupling member with the play element. A variation of this scheme requires the retaining structure of the play element to have a stationary strip and a flap hingedly attached to the strip with the VELCRO hook and loops on juxtaposed surfaces of the strip and flap. The coupling member will then be receivable between the strip and flap to form a secure connection.

Still a further alternative connecting arrangement, the coupling member will further include a flexible strip of material windable around the play element to secure the same.

Another alternative of coupling arrangement involves the coupling member having a plurality of wire leg projections and the play element having a plurality of flap-like leg portions. Each of the leg portions are wrappable around the respective leg projections. VELCRO type retaining structures may be provided on the flap-like leg portions.

Another embodiment of the toy involves the play being in the shape of an animal (e.g., rodent) which surrounds the housing. A set of wheels allows the play element and housing to be movable along the ground. The wheels are driven by a gear train which in turn is driven by the shaft, A switch for operating the motor may be mounted on the housing. There may also be a lever with lever arm pivotally mounted on the housing. When depressed the lever arm will be capable of contacting the switch to activate the same and cause the play element/toy to move along the ground. The lever arm may preferably have a cam surface juxtaposed to the switch for interaction therewith.

A still further embodiment of the toy involves the play element being present as a hollow ball and housing mounted therein. Located along a plurality of areas on the surface of the hollow ball may be mechanisms for operating the motor to induce vibration in the ball.

A final embodiment of the vibrating toy eliminates the mechanism for eccentric vibration. In its place at least a portion of the wire is coaxial with the shaft that is driven by the motor. The play element, preferably a toy butterfly, is attached to a free end of the wire and caused to vibrate through receipt of direct vibrations from the rotating shaft along the wire.

BRIEF DESCRIPTION OF THE DRAWINGS

Other important objects and advantages of the invention will be apparent from the following detailed description taken in conjunction with the accompanying drawings in which:

FIG. 1 is a perspective view of an interactive vibrating toy made in accordance with the present invention;

FIG. 2 is a cross-sectional view taken along the line 2—2 of FIG. 1;

FIG. 11 is a fragmentary exploded perspective view of a toy mouse in the process of being attached to the end portion of the interactive vibrating toy of FIG. 1;

FIG. 11A is a fragmentary end view showing a leg portion of the toy mouse of FIG. 11 attached to a leg wire;

DETAILED DESCRIPTION OF THE INVENTION

Figure 3:
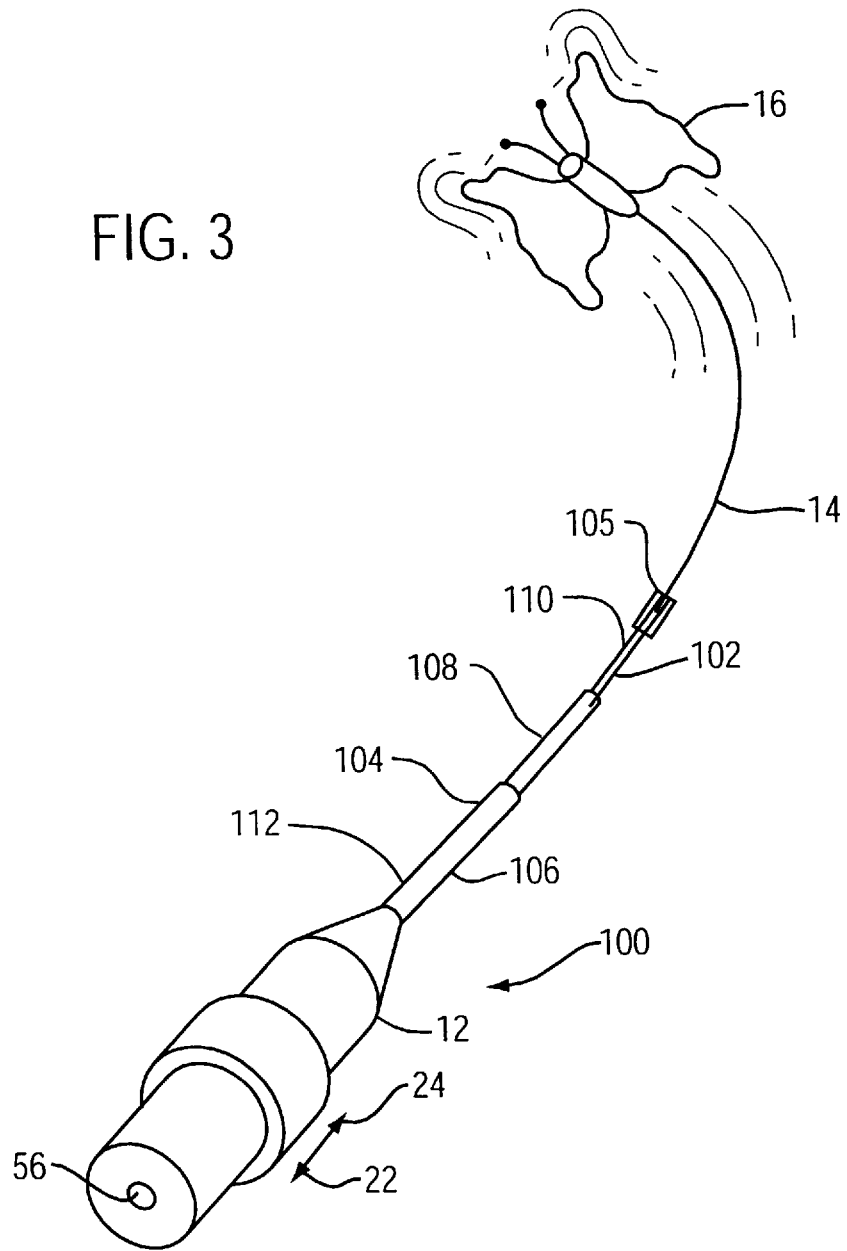
FIG. 3 is a perspective view of an alternative embodiment of the interactive vibrating toy of FIG. 1 which incorporates a telescoping member to extend the length of the toy.

With reference to the drawings there is shown in FIGS. 1 and 2 an interactive vibrating toy 10, made in accordance with the present invention which includes a housing 12 which is connected to a flexible wire 14 and a removably mounted toy butterfly 16 or other toy insect or toy animal. The housing 12 includes an adjustable cylindrical collar 18 which closely fits the cylindrical outer surface 20 of the housing 12 and which can be moved in the directions shown by the arrows 22,24 in FIG. 1 to adjust the amplitude characteristics of the vibration of the housing 12 in a manner which will be presently described.

The internal construction of the housing 12 is shown schematically in FIG. 2. The housing 12 is hollow and contains a battery 26 which is connected to a motor 28 via a pair of leads 30,32 and which is also connected to an on-off switch 34 via a pair of leads 36,38. The motor 38 has a shaft 40 on which an eccentric weight 42 is mounted.

Moving the switch 34 to the on position by pushing the button in the direction shown by the arrow 44 causes the motor 28 to rotate and the eccentric weight 42 causes the entire housing 12 to vibrate. The front 46 of the housing 12 has a tapered portion 48 as is shown in FIGS. 1 and 2 and an attachment assembly 50, which may be in the nature of a small chuck or a small collet which has adjustable jaws 51 is mounted on the end 52 of the housing 12 for the removable attachment of the wire 14 to the housing 12. The rear 54 surface of the housing 12 includes a central opening 56 the purpose of which will be described presently.

The wire 14 is preferably made of a flexible metal and the vibration of the housing 12 is transmitted to the wire 14 as is shown in FIG. 1. The toy butterfly 16 which is removably mounted on the end 58 of the wire 14 has wings 60,62 which are made of a relatively light weight material. Vibration of the wire 14 is transmitted to the toy butterfly 16 causing the toy butterfly 16 to vibrate with a motion that resembles an actual live butterfly thereby providing a life-like appearance.

Adjustment of the collar 18 in the directions shown by the arrows 22,24 in FIG. 1 changes the amplitude of the vibration transmitted to the end 53 of the wire 14. The length and flexibility of the wire 14 causes complex whiplike and a predictable motion of the end 58 of the wire 14 and provides a life-like flight characteristic to the toy butterfly 16.

The ability to vary the vibration level of the housing 12 by adjusting the position of the collar 18 enables a user to play with a cat, or other animal, which is attached to the flight-like motion of the toy butterfly 16, in an interactive manner which is continuously enjoyable for extended periods of time.

FIG. 3 shows an alternative embodiment 100 of the invention in which the wire 14 has been removed from the jaws 51 on the housing 12 and the wire 14 has been removably attached to the end 102 of a telescoping member 104 by a connector 105 which fits around the wire 14 and the member 110. The telescoping member 104 is generally similar to a telescoping automobile antenna in construction and includes three tubular members 106,108,110. The end 112 of the tubular member 106 is removably attached to the housing 12 in the manner previously described. Vibration of the housing 12 caused by rotation of the eccentric weight 42 causes whiplike motion of the telescoping member 104 and extremely complex large amplitude whiplike motion by the wire 14 and the toy butterfly 16. The combination of the relatively stiffer telescoping member 104 and the relatively flexible wire 14 causes large amplitude, complex and completely unpredictable motion patterns of the toy butterfly 16 which provide a life-like flight pattern.

Figure 4:
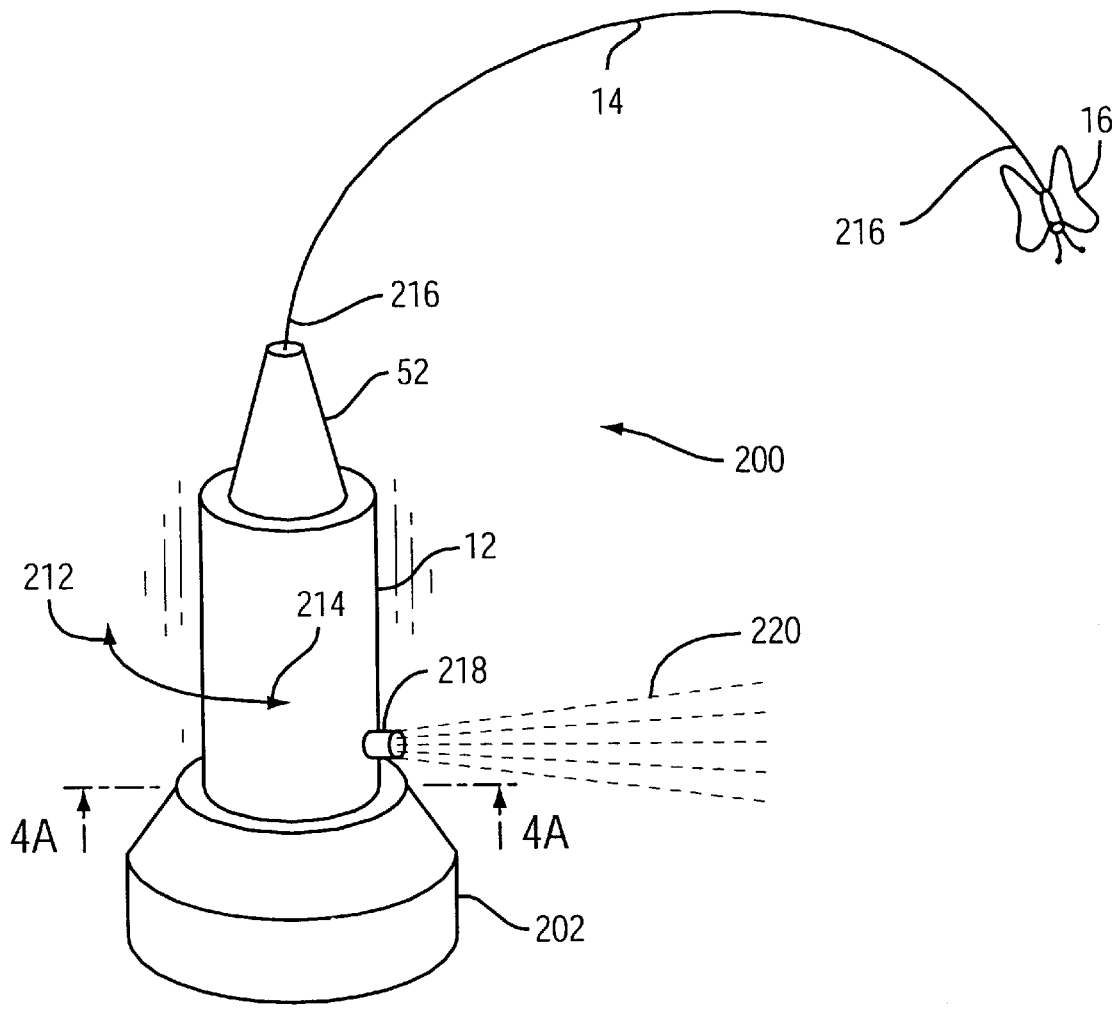
FIG. 4 is a perspective view of another embodiment of the interactive vibrating toy of FIG. 1 which incorporates a base and a rotatably mounted housing.

FIG. 4 shows an alternative embodiment of the invention 200 in which the housing 12 is rotably mounted on a base member 202. The base member 202 has a central cavity 204 which is proportioned to accept the end of the housing 12.

Figure 4A:
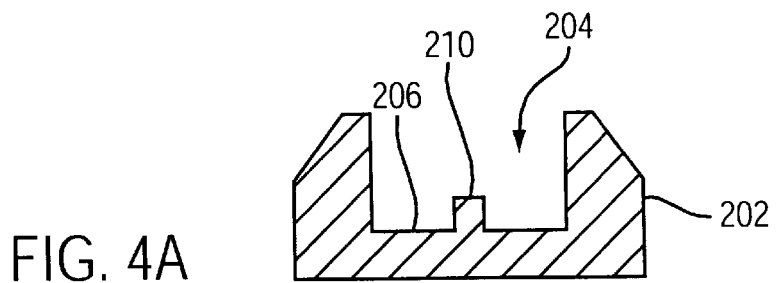
FIG. 4A is a fragmentary cross-sectional view taken along the line 4A—4A of FIG. 4.

The cavity 204 is best shown in FIG. 4A. The bottom 206 of the cavity 204 includes a small centrally located base 210. The base 210 projects in the opening 56 in the housing 12 and enables the housing 12 to rotate relative to the base member 202 as indicated by the arrows 212,214 in FIG. 4. Rotation of the eccentric weight 42 in the housing 12, as previously described, causes the housing 12 to vibrate and rotate relative to the base 202. This combined vibration and rotation is transmitted to the end 216 of the wire 14 which is attached to the end 52 of the housing 12 in the manner which has been previously described. This combined rotation and vibration of the wire 14 causes complex and life-like motion of the toy butterfly 16 which is mounted at the end 216 of the wire 14. The housing 12 also includes an infra-red motion detector and electronic timer circuit which are shown symbolically by the cylinder in FIG. 4 and which are connected to the motor. The infra-red motion detector 218 projects a beam which is indicated by the broken lines 220. The details of construction of the infra-red motion detector 218 and electronic timer circuit are conventional in nature and are therefore not shown in detail.

When a cat or other animal interrupts the beam 220, the motor 28 turns on and the toy butterfly 16 begins to move until a preselected time period has elapsed after which, the motor 28 shuts off and the time circuit resets itself. When the beam 220 is again interrupted, the motor 28 turns on again, and again attracts the cat or other animal for continued play.

FIGS. 5–10 show various alternative mounting connections for removable attachment of the toy butterfly 16 or another toy creature to the end 306 of the wire 14 as described below.

Figure 5:
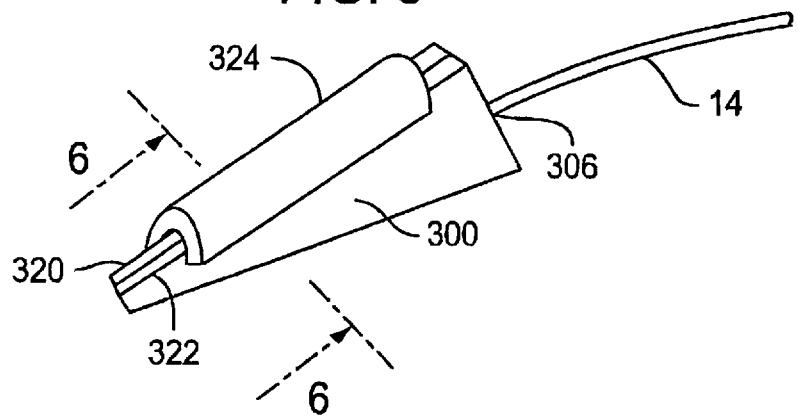
FIG. 5 is a perspective view of the end portion of the interactive vibrating toy of FIG. 1 showing the removable mounting of a toy butterfly.
Figure 6:
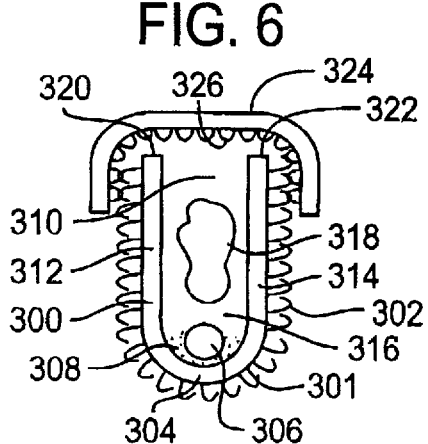
FIG. 6 is a cross-sectional view taken along the line 6—6 of FIG. 5.

FIGS. 5 and 6 show a wedge shaped member 300 the outer surface 301 of which has hook members 302 which are part of a hook and loop type fastener typically sold under the tradename VELCRO. The central portion 304 of the wedge shaped member 300 is attached to the end 306 of the wire 14 by means of an adhesive layer 308. The space 310 between the walls of the member 300 forms a cavity 316 into which a substance such as catnip 318 may be placed in order to attract a cat. The tops 320,322 of the walls, 312,314 are connected by a flexible top member 324 which has loop members 326 which engage the hook members 302 as is shown in FIG. 6.

Figure 7A:
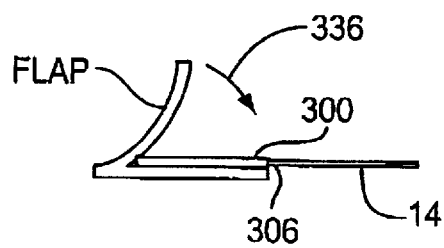
FIG. 7A is a fragmentary perspective view showing a toy butterfly in the process of being attached to the end portion of FIG. 8.
Figure 7:
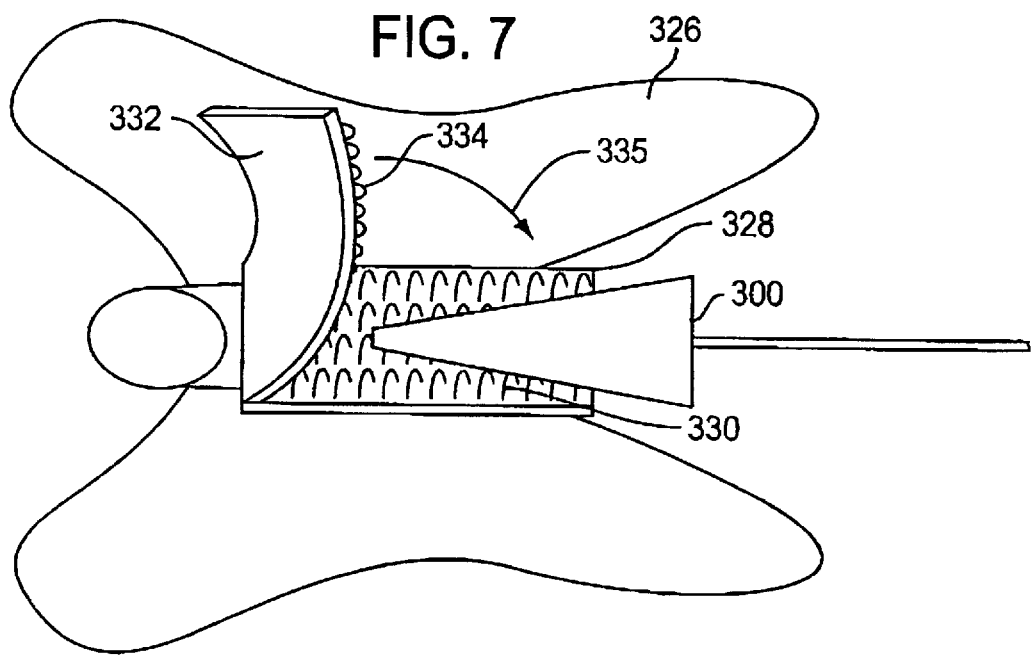
FIG. 7 is a top view of a toy butterfly being mounted on the end of the interactive vibrating toy of FIG. 1.

The toy butterfly 326 has a section 328 which has hook members 330 of the type described above and a flexible flap member 332 which has loop members 334. In use, the wedge shaped member 300 is placed on the section 328 as is shown in FIGS. 7 and 7A and the flap member 332 is closed over the wedge shaped member 300 as indicated by the arrows 335,336 in FIGS. 7 and 7A thereby securely and removably connecting the toy butterfly 326 and the end 306 of the wire 14.

Figure 8:
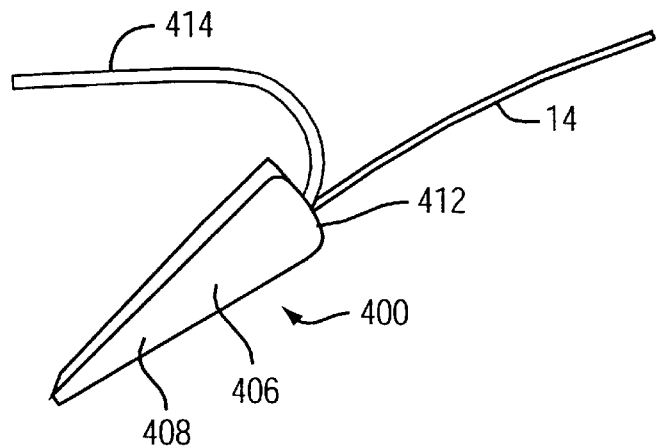
FIG. 8 is a perspective view of an alternative embodiment of the end portion of the interactive vibrating toy of FIG. 1.
Figure 9:
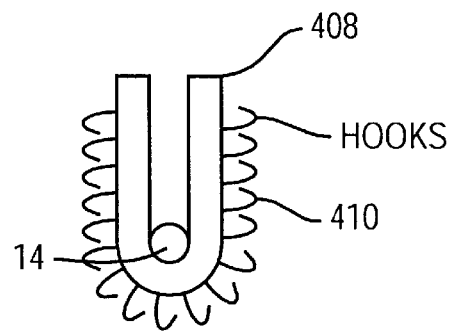
FIG. 9 is a cross-disectional view taken along the line 9—9 of FIG. 8.
Figure 10:
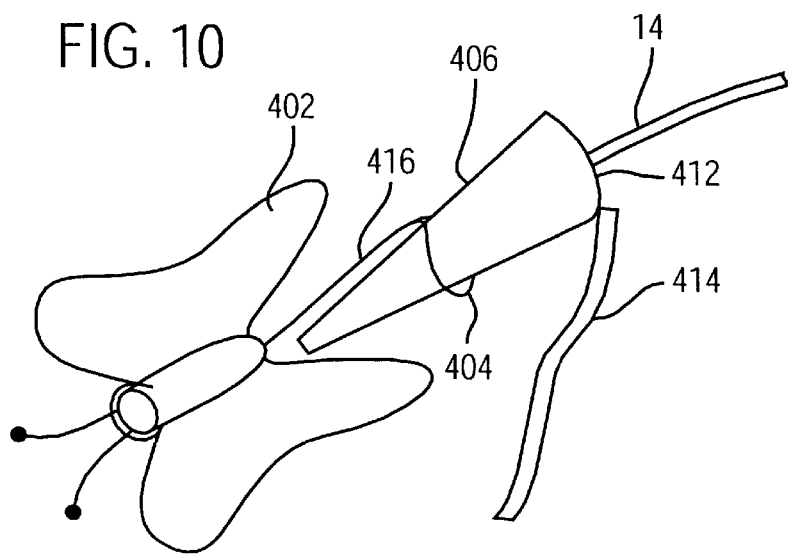
FIG. 10 is a top view of a toy butterfly being mounted in an alternative embodiment on the end of the interacting vibrating toy of FIG. 1.

FIGS. 8, 9 and 10 show an alternative embodiment of the invention 400 in which the toy butterfly has a wire loop 404 which projects from the rear of the body 406. The wire loop 404 fits around the wedge member 406 as is shown in FIG. 10. The surface 408 of the wedge member 406 is covered with hook member 410 as previously described and the end 412 of the wedge member 406 has a flexible strip of loop material 414. In use the wire loop 404 is inserted onto the wedge member 406 and the strip of loop material 414 is wound around the wire 416 thereby holding the toy butterfly 402 securely in place.

FIG. 11 shows an alternative embodiment of the invention 500 in which there is a toy mouse 502. The toy mouse 502 has a body portion 504 which has a head portion 506 and four flap-like leg portions 508,510,512,514. A wedge shaped base portion 516 is provided which has four wire leg projections 518,520,522,524. The surface 526 of the base 516 portion includes loop members 528 which attach the portion 516 to the toy mouse 502 in the manner previously described. The flap-like leg portions 508,510,512,514 have hook members 530 and loop members 532.

In use, the body portion 504 of the toy mouse 502 is placed on the wedge shaped base portion 540 and each of the flap-like leg portions 508,510,512,514 is wrapped around a wire leg 518,520,522,524 as is shown in FIG. 11A with the hook 530 and loop members 532 interengaged, thereby holding the toy mouse 502 securely attached to the end 534 of the wire 536.

Figure 12:
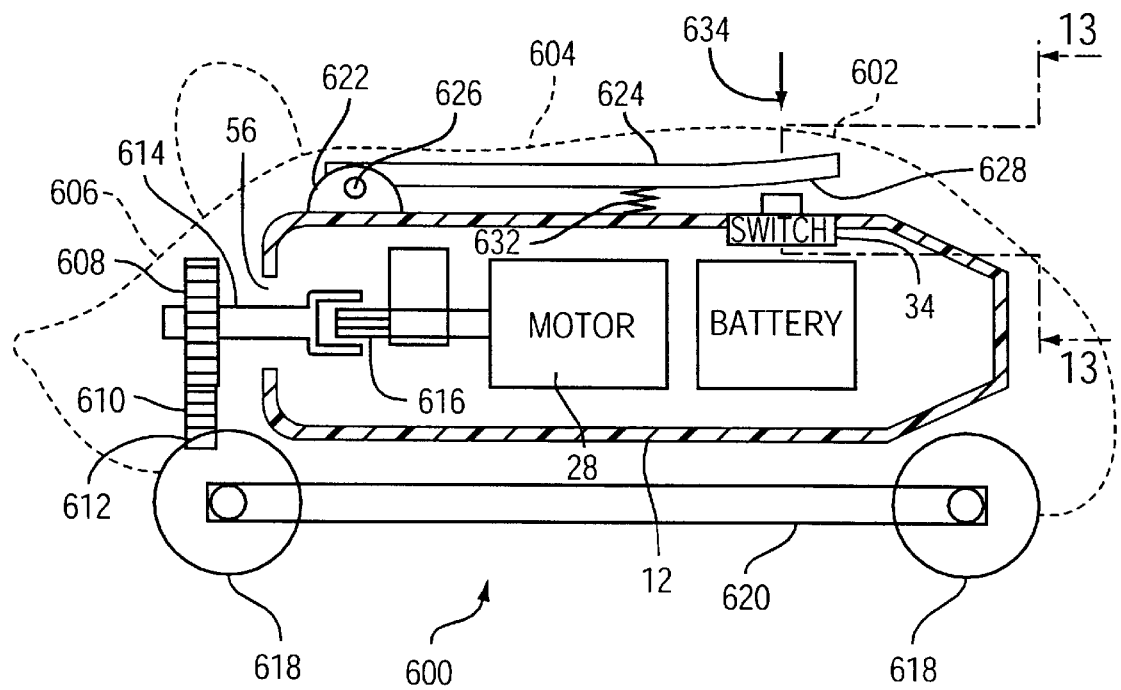
FIG. 12 is a schematic view of another alternative embodiment of the interactive vibrating toy of FIG. 1 in which the housing shown in FIG. 1 has been detached from the wire of FIG. 1 and has been inserted into the body of a toy mouse.

FIG. 12 shows an alternative embodiment of the invention 600 in which the housing 12 of FIG. 1 has been placed in the flexible body of a toy mouse 604 which is indicated schematically by the broken lines 606. A pair of gears 608,610 which are part of a gear train 612 are mounted in the body 602 of the toy mouse 604 and a drive shaft 614 projects through the opening 56 in the surface 54 of the housing 12 to engage main shaft 616 which is connected to the motor 28. The gears 608,610,612 drive wheels 618 which are mounted on a base 620 of the toy mouse 604 to drive the toy mouse 604 along the ground.

The body 602 of the toy mouse 604 includes a bracket 622 on which a lever 624 is pivotally mounted by means of a pivot 626. The inner surface 628 of the lever 624 includes a cam surface 630 which is disposed proximate to the on-off switch 34. The lever 624 normally is held away from the housing 12 by a helical spring 632.

Figure 13:
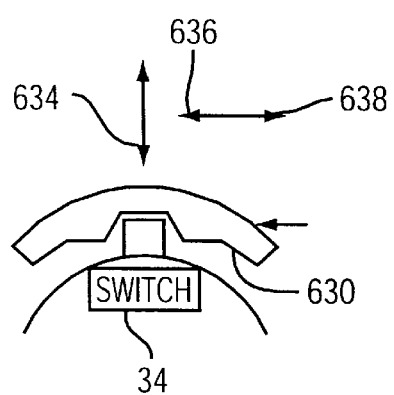
FIG. 13 is a cross-sectional view taken along the line 13—13 of FIG. 12.

Pressure on the lever 624 in the directions shown by the arrows 634,636,638 in FIG. 13 which may be exerted by a cat through the flexible body 602 of the toy mouse 604 turns the motor 28 on and drives the toy mouse 604 along the ground.

Figure 14:
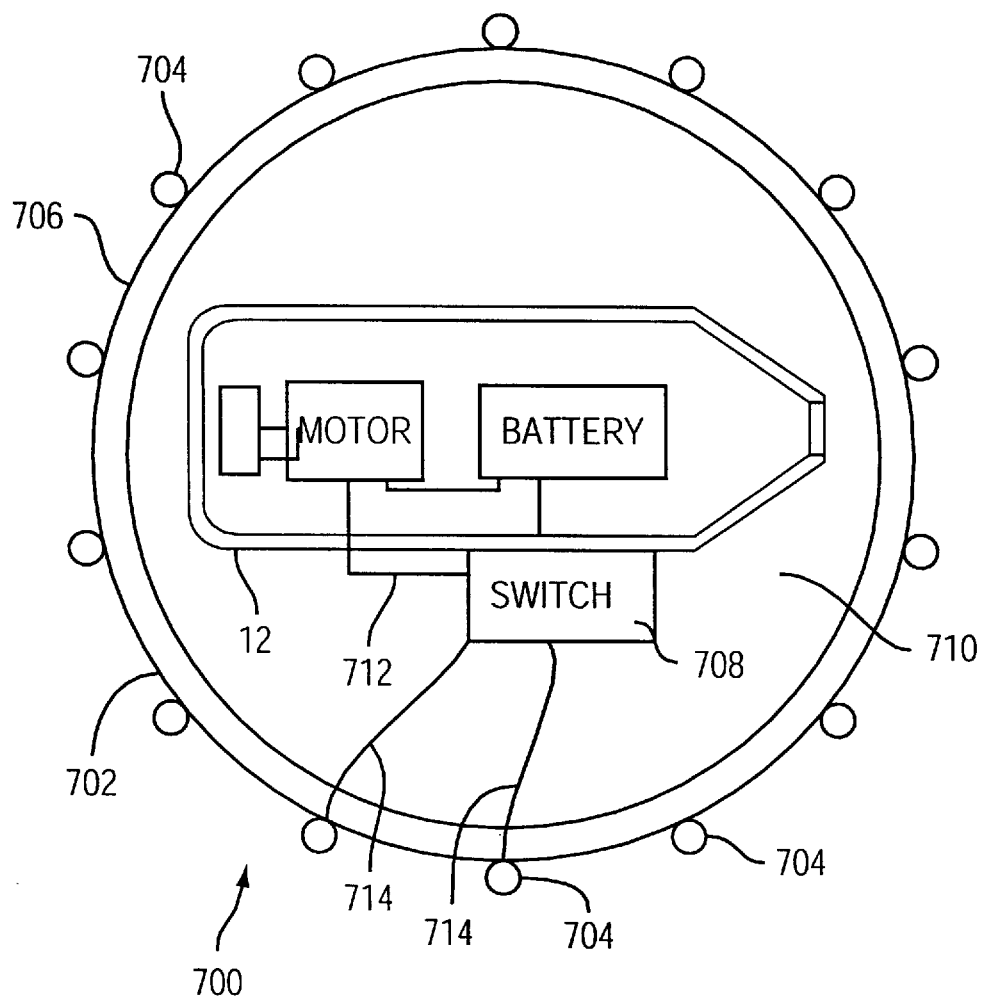
FIG. 14 shows another alternative embodiment of the interactive vibrating toy of FIG. 1 in which the housing of FIG. 1 has been removed from the wire of FIG. 1 and has been inserted into a toy ball.

FIG. 14 shows another embodiment of the present invention 700 in which the wire 14 is removed from the housing 12 of FIG. 1 and the housing 12 is installed in a hollow ball 702. The hollow ball 702 includes conductive wires 704 mounted on the outer surface 706 of the ball 702 and a touch switch 708 is mounted in the interior 710 of the ball 702 and is connected to the motor 28 via lead 712. The touch switch is connected to the conductive wires 704 by leads which are indicated typically by the leads 714. If a cat or another animal or a person touches the conductive wires 704, the motor 28 is turned on and the ball starts to vibrate and roll along the ground.

Figure 15:
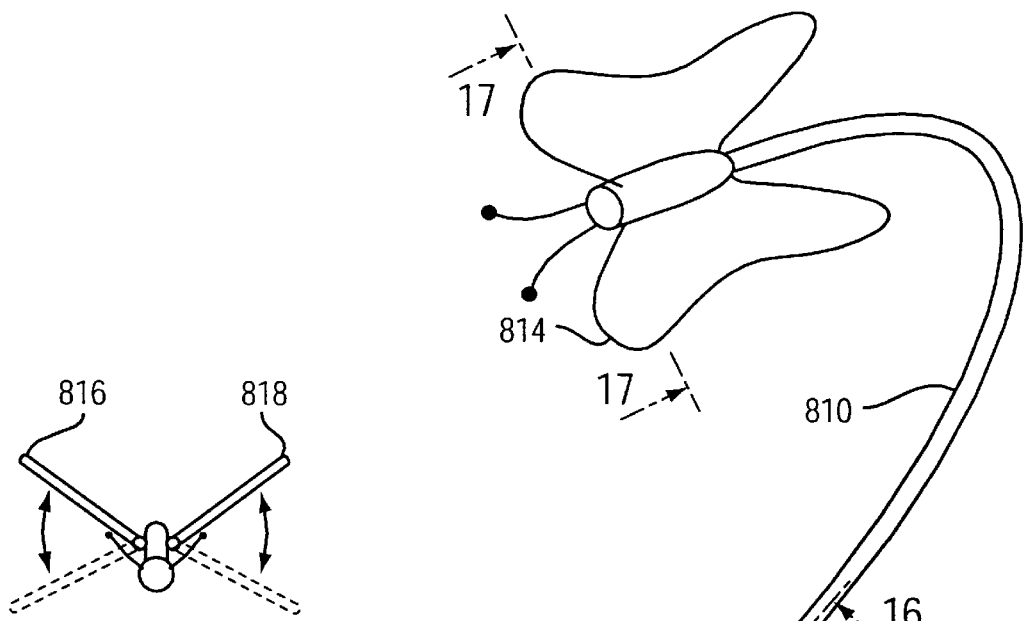
FIG. 15 is a perspective view of yet another embodiment of the interactive vibrating toy of FIG. 1.
Figure 17:
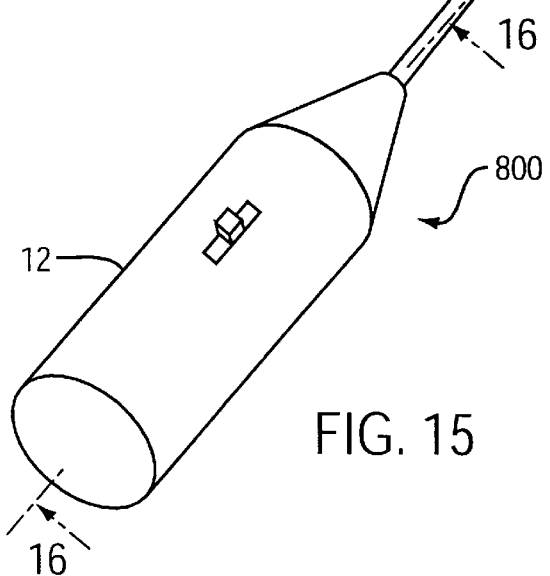
FIG. 17 is a view taken along the line 17—17 of FIG. 15.
Figure 16:
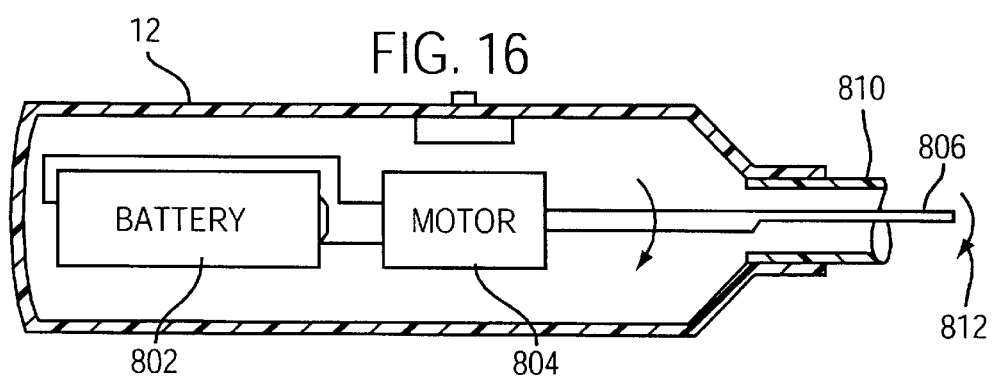
FIG. 16 is a cross-sectional view taken along the line 16—16 of FIG. 15.

FIGS. 15–17 show yet another embodiment of the invention 800 in which the housing 12 includes a battery 802 which operates a motor 804 which rotates a flexible wire 806 which is rotably mounted in a flexible sleeve 810. The rotation of the wire 806 is indicated by the arrow 812 in FIG. 16. A butterfly toy 814 is mounted on the end of the toy and the wings 816,818 of the butterfly toy 814 are caused to flap as is indicated in FIG. 17 as a result of the rotation of the wire 806.

Although several preferred embodiments of the invention have been described above by way example only, it will be understood by those skilled in the art that modifications may be made to the disclosed embodiments without departing from the scope of the invention, which is defined by the appended claims.

What is claimed:

1. A vibrating toy comprising:

a housing;

a battery mounted within said housing;

a motor mounted within said housing activated by said battery;

a shaft driven by said motor;

a means on said shaft for imparting vibration to said housing;

a play element outside of said housing;

a means for connecting said play element to said housing and through which said play element can receive vibrations generated from said means for imparting said vibration;

said housing having an aperture, a first end and a second end and said means for connecting comprising a wire fastened within the said first end and extending outward through said aperture;

said housing rotatably mounted on a stationary base member, rotation being induced by said means for imparting vibration; and an infra-red motion detector arranged in said housing to project an infra-red light beam outward from said housing and to sense movement.

2. A vibrating toy according to claim 1 further comprising an electronic timer arranged in said housing, electrically communicating with said motion detector and motor to activate and deactivate said motor for preselected time.

3. A vibrating toy according to claim 1 wherein said coupling member is wedged-shaped.

4. A vibrating toy comprising:

a housing;

a battery mounted within said housing;

a motor mounted within said housing activated by said battery;

a shaft driven by said motor;

a means on said shaft for imparting vibration to said housing;

a play element outside of said housing;

a means for connecting said play element to said housing and through which said play element can receive vibrations generated from said means for imparting said vibration;

said housing having an aperture, a first end and a second end and said means for connecting comprising a wire fastened within the said first end and extending outward through said aperture;

said wire further comprising a coupling member attached to an end thereof distant from said first end of said housing, said coupling member being in contact with and retaining said play element;

said coupling member having walls folded to retain between said walls a food attractive to animals.

5. A vibrating toy according to claim 4 wherein said coupling member on an outer surface thereof has retaining structures with hooks and loops and a flexible top member with corresponding retaining structures interacting with said coupling member outer surface to maintain same in a folded condition.

6. A vibrating toy comprising:

a housing;

a battery mounted within said housing;

a motor mounted within said housing activated by said battery;

a shaft driven by said motor;

a means on said shaft for imparting vibration to said housing;

a play element outside of said housing;

a means for connecting said play element to said housing and through which said play element can receive vibrations generated from said means for imparting vibration;

said housing having an aperture, a first end and a second end and said means for connecting comprising a wire fastened within the said first end and extending outward through said aperture;

said wire further comprising a coupling member attached to an end thereof distant from said first end of said housing, said coupling member being in contact with and retaining said play element;

said coupling member and play element have retaining structures with hooks and loops to releaseably fasten together said coupling member with said play element;

said retaining structure of said play element having a stationary strip and a flap hingedly attached to said strip with hooks and loops on juxtaposed surfaces of said strip and flap, said coupling member being receivable between said strip and flap.

\* \* \* \* \*